US012617476B2

(12) United States Patent    (10) Patent No.:   US 12,617,476 B2

Ignes I Mullol et al.    (45) Date of Patent:    May 5, 2026

---

(54) REINFORCEMENT OF A VEHICLE STRUCTURE WHERE A GEAR BOX IS CONNECTED

(71) Applicant: Zephyros, Inc., Romeo, MI (US)

(72) Inventors: Nuria Ignes I Mullol, Molsheim (FR); Robert I Baertl, Molsheim (FR); Frederic Jung, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 267 days.

(21) Appl. No.: 17/801,082

(22) PCT Filed: Feb. 26, 2021

(86) PCT No.: PCT/EP2021/054868

§ 371 (c)(1),
(2) Date: Aug. 19, 2022

(87) PCT Pub. No.: WO2021/175720

PCT Pub. Date: Sep. 10, 2021

(65) Prior Publication Data

US 2023/0081643 A1    Mar. 16, 2023

(30) Foreign Application Priority Data

Mar. 2, 2020   (EP) .................................... 20160397

(51) Int. Cl.
   B62D 29/00      (2006.01)
   B62D 25/00      (2006.01)

(52) U.S. Cl.
   CPC ........... B62D 29/002 (2013.01); B62D 25/00 (2013.01)

(58) Field of Classification Search
CPC .... B62D 29/002; B62D 29/048; B62D 25/00; B62D 25/082; B62D 25/085; B62D 27/02; B62D 27/023; B29C 44/18; B60K 17/00
USPC .......... 296/187.02, 193.01, 193.02; 180/312, 180/377, 300
See application file for complete search history.

(56) References Cited

U.S. PATENT DOCUMENTS

| | | | | |
|---|---|---|---|---|
| 6,114,004 A | * | 9/2000 | Cydzik | ................ B62D 29/002 |
| | | | | 428/192 |
| 6,467,834 B1 | * | 10/2002 | Barz | .................... B62D 29/002 |
| | | | | 296/203.02 |
| 6,471,285 B1 | * | 10/2002 | Czaplicki | ............. B62D 29/002 |
| | | | | 296/187.02 |
| 6,793,274 B2 | * | 9/2004 | Riley | ................... B62D 21/152 |
| | | | | 296/187.03 |

(Continued)

FOREIGN PATENT DOCUMENTS

| | | |
|---|---|---|
| DE | 102012213663 A1 | 2/2014 |
| EP | 2154052 A1 | 2/2010 |
| WO | 2010/054194 A1 | 5/2010 |

OTHER PUBLICATIONS

International Search Report & Written Opinion dated May 11, 2021, Application No. PCT/EP2021/054868.

(Continued)

*Primary Examiner* — Amy R Weisberg
*Assistant Examiner* — Wenwei Zhuo
(74) *Attorney, Agent, or Firm* — The Dobrusin Law Firm, P.C.

(57)      ABSTRACT

The present invention relates to a vehicle with a structure, which comprises connection-means and a reinforcement member.

15 Claims, 4 Drawing Sheets

(56)                    References Cited

U.S. PATENT DOCUMENTS

| | | | | |
|---|---|---|---|---|
| 7,198,691 | B2 * | 4/2007 | Ludin | B29C 70/48 244/133 |
| 7,854,474 | B2 * | 12/2010 | Cox | B62D 25/082 180/312 |
| 8,911,008 | B1 * | 12/2014 | Campbell | B60J 7/0084 296/213 |
| 8,966,766 | B2 * | 3/2015 | Richardson | B62D 29/002 29/897.34 |
| 9,394,009 | B2 * | 7/2016 | Jäschke | B60J 5/0402 |
| 9,555,840 | B2 * | 1/2017 | Belpaire | B62D 21/09 |
| 10,161,543 | B2 | 12/2018 | Richardson | |
| 10,252,754 | B2 | 4/2019 | Feng et al. | |
| 10,434,747 | B2 | 10/2019 | Richardson | |
| 10,538,277 | B2 | 1/2020 | Belpaire | |
| 11,827,277 | B2 * | 11/2023 | Deachin | B62D 25/00 |
| 2010/0117397 | A1 * | 5/2010 | Richardson | B62D 29/002 296/187.02 |
| 2021/0039720 | A1 * | 2/2021 | Mosch | B62D 27/02 |
| 2021/0046978 | A1 * | 2/2021 | Forostovsky | B60G 3/20 |
| 2022/0169317 | A1 * | 6/2022 | Richardson | B62D 29/048 |
| 2022/0204095 | A1 * | 6/2022 | Richardson | B62D 29/002 |

OTHER PUBLICATIONS

Chinese First Office Action & Search Report dated Jun. 28, 2025 (Application No. 202180018435.7.

* cited by examiner

8

12

9

10   11

1

REINFORCEMENT OF A VEHICLE STRUCTURE WHERE A GEAR BOX IS CONNECTED

The present invention relates to a vehicle with a structure, which comprises connection-means and a reinforcement member.

Such vehicle structures are well known, for example from automotive applications, the so-called body in whites. To this structure, parts like the motor, the gearbox etc. are connected, so that connection-means at the structure have to be provided The structures according to the state in the art have the deficiency, that in some cases, particularly in the region in which the gear box is attached, the vibrations of the structure in the region in which the part is attached are too high and/or the stiffness of the structure in the region in which the part is attached is too low.

It was therefore the problem of the present invention to provide a vehicle that does not have the deficiencies according to the state in the art.

The problem is attained with a vehicle with a structure, which comprises connection-means and a reinforcement member, wherein the reinforcement member comprises at least one recess which takes the connection means up and/or which fits onto the connection means.

The disclosure regarding this embodiment of the present invention also applies to the other embodiment and vice versa. Subject matters disclosed regarding this subject matter can be incorporated into the other subject matter and vice versa.

The present invention relates to a vehicle with a structure. The structure can be the so-called body in white. To this structure a part can be connected. In the case of an automotive, such a part is for example the motor, a battery-case, but preferably a gearbox.

For the connection of the part to the structure of the vehicle, connection means is provided. The connection means is preferably hollow, more preferably tube-like. The connection means is attached to the structure, preferably by gluing or welding. In case the connection means is a tube, at one end of this tube, a flange may be provided, which is preferably attached to the structure. Preferably, the tube has a round or polygonal cross section. More preferably, the shape of the cross section of the tube corresponds to the outer circumferential shape of a nut, that may be inserted into the tube.

The vehicle further comprises a reinforcement member, which reinforces the structure of the vehicle. This reinforcement member preferably comprises a carrier and a foamable-layer, which is foamed and thereby expands.

According to the present invention, the reinforcement member comprises one of more recesses, which each take a connection means up. Preferably, the shape of the inner cross section of each recess corresponds at least essentially with the outer circumference of the connection means. Preferably, there is a form-fit, preferably a press-fit between the inner circumference of the recess and the outer circumference of the connection means. In case there is a multitude of connection means, preferably only some, preferably two or three, but preferably not all connection means are press-fitted into the recesses of the reinforcement member.

The part, preferably the gear box, is, for example, attached to the structure of the vehicle by a screw with or without a nut or a rivet and/or by a bolt, preferably a tap and die bolt. The nut is, for example, inserted into the connection means, particularly in case the connection means being a tube.

According to another inventive or preferred embodiment of the present invention, the reinforcement member is located at or in the structure where a gearbox is fixed to the structure.

The disclosure regarding this embodiment of the present invention also applies to the other embodiment and vice versa. Subject matters disclosed regarding this subject matter can be incorporated into the other subject matter and vice versa.

According to this subject matter of the present invention, a reinforcement member is located at the location at which the gear-box is connected to the structure of the vehicle, preferably inside the cavity of the structure.

Preferably, the reinforcement member comprises a carrier and a foamable-layer. The carrier improves the stiffness of the structure of the vehicle, particularly the region in which the gearbox is located. The foamable layer, after its expansion, can be an adhesive- and/or a structural foam and can also improve the stiffness of the structure of the vehicle, particularly in the region, in which the gearbox is located.

Preferably, the foamable layer is provided on the surface of the carrier. Preferably, the foamable layer is provided on two opposing surfaces. The foamable can be a continuous layer. Preferably, the foamable layer, at least on one of the opposing surfaces are at least locally intermittent. More preferably, the foamable layer is provided on the opposing surfaces as an alternating sequence.

According to a preferred embodiment of the present invention, the carrier and/or the foamable-layer comprise each a recess, wherein at least one recess takes up the connection means and/or fits onto the connection means. Preferably, at least the recess in the carrier takes up the connection means, preferably, the tube and/or fits onto the connection means Preferably, there is a form- and/or force-fit between the at least some, preferably two or three of the connection means and the carrier and/or the foamable-layer.

Preferably, the connection means is a tube, preferably with a flange. The flange is preferably attached to the structure of the vehicle, preferably glued or welded. The inner circumference of the tube is preferably polygonal. More preferably, the shape of the inner cross section of the tube corresponds to the outer circumferential shape of a nut, which is utilized to attach the part, preferably the gearbox to the structure. The nut is part of a nut-screw-connection.

According to a preferred embodiment of the present invention, the carrier comprises in its recess attachment means, preferably protrusions, which are in contact with the outer circumference of the connection means and are utilized to provide a press-fit between the protrusions and the outer circumference of the preferably tube-like connection means. The protrusion can be three or more nose-like embodiments extending out of one or more recess of the carrier and/or the foamable-layer.

Preferably, the cross-section of the tube→connection means is unblocked prior, during and/or after the expansion of the foamable-layer. Preferably, this can be achieved by closing the recess of the carrier on the side which is pointing away from the connection means. The side of the recess which is pointing towards the connection means remains open so that it can take up the connection means, preferably, the tube. To avoid that the foamable-layer is expanding into the cross section of the connection means from the open side of the recess, the shape and size of the inner circumference of the recess corresponds as much as manufacturing and assembly tolerances allow to the outer circumference of the connection means.

This preferred embodiment allows to insert a fastening means, for example a nut into the tube and/or a bolt, preferably a tap and die bolt. By means of this nut the part, preferably the gear box can be connected to the structure of the vehicle.→By this fastening means the part, is connected to the vehicle structure.

The connection means is preferably a tube, or a weld-on nut, or a nut which is inserted into the tube.

The fastening means is preferably a tap, a die bolt and/or a regular bolt.

According to a preferred embodiment of the present invention, the reinforcement member is provided in a cavity of the structure of the vehicle. After the reinforcement member has been attached to the structure of the vehicle and preferably after the fastening means have been inserted into the connection means, preferably the tube, the foamable material can be expanded, preferably under the influence of heat.

Alternatively or additionally, after the reinforcement member has been attached to the structure the foamable material can be expanded, preferably under the influence of heat. After the foamable material has expanded, the fastening means, preferably a tap and die bolt, can be inserted into the connection means, preferably the tube.

The invention is now explained according to the figures. These explanations are only exemplary and do not limit the scope of protection of the present invention. The explanations apply to all embodiments of the present invention likewise.

Figure 1:
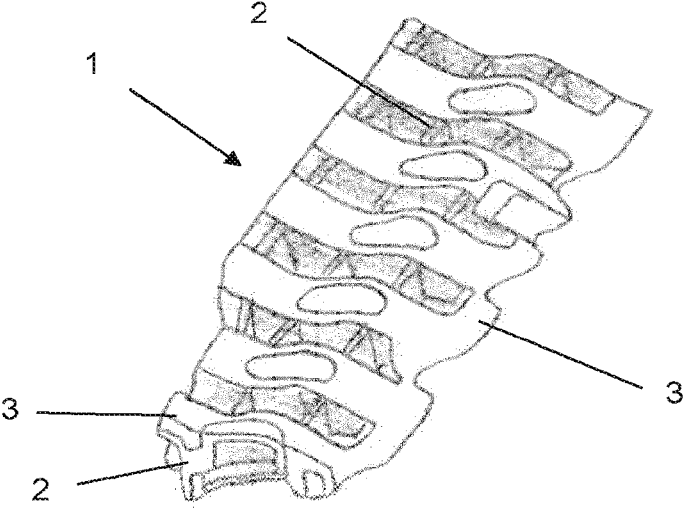
FIGS. 1 and 2 show the reinforcement member 1.
Figure 2:
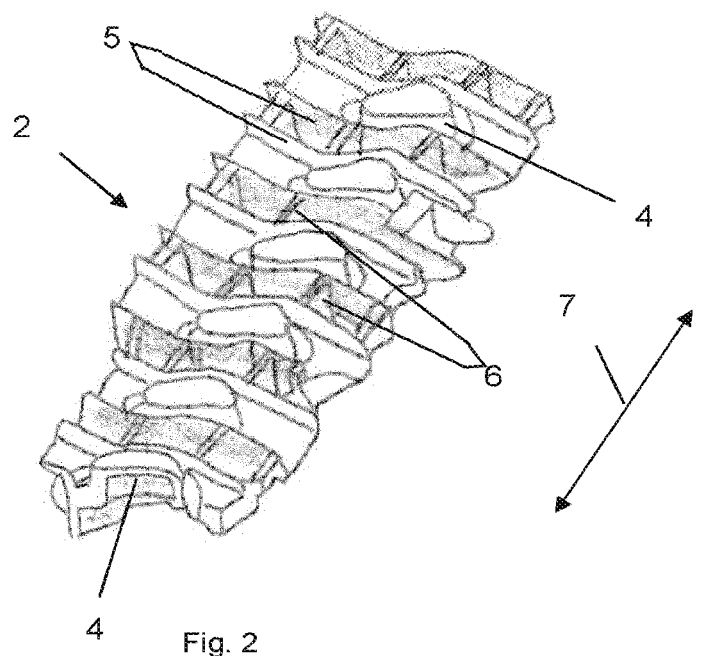

FIGS. 1 and 2 show details of the reinforcement member 1, wherein, in FIG. 2 only the carrier without the foam layer is depicted. The reinforcement layer comprises a carrier 2 and a layer of unexpanded foam 3. Furthermore, the carrier 1 comprises a multitude, preferably more than two recesses 4. The carrier may also comprise longitudinal and/or transverse ribs 5, 6. As can also be seen from the figures, the reinforcement member 1 comprises a longitudinal extension, depicted by the double-arrow 7, and the recesses are preferably arranged in along in this longitudinal extension, preferably in one straight line. The recesses are spaced apart, preferably equidistantly. Between two adjacent recesses 4, preferably a hollow section is provided. According to a preferred embodiment, the recesses 4 have a hollow inner cross-section. The sidewall of the recesses is preferably tube-shaped. The recesses may have a round cross-section or a polygonal cross section. The foamable-layer 3 is preferably applied to the surface of the carrier and more preferably not as a continuous, but as an intermittent layer. The foamable-layer can be adhered to the carrier 2 by over-moulding. The carrier is preferably made from a plastic material. The foamable-layer preferably expands, more preferably under the influence of heat. The foamable-layer is, after expansion, preferably a structural foam, which provides rigidity to the structure of the vehicle.

Figure 3:
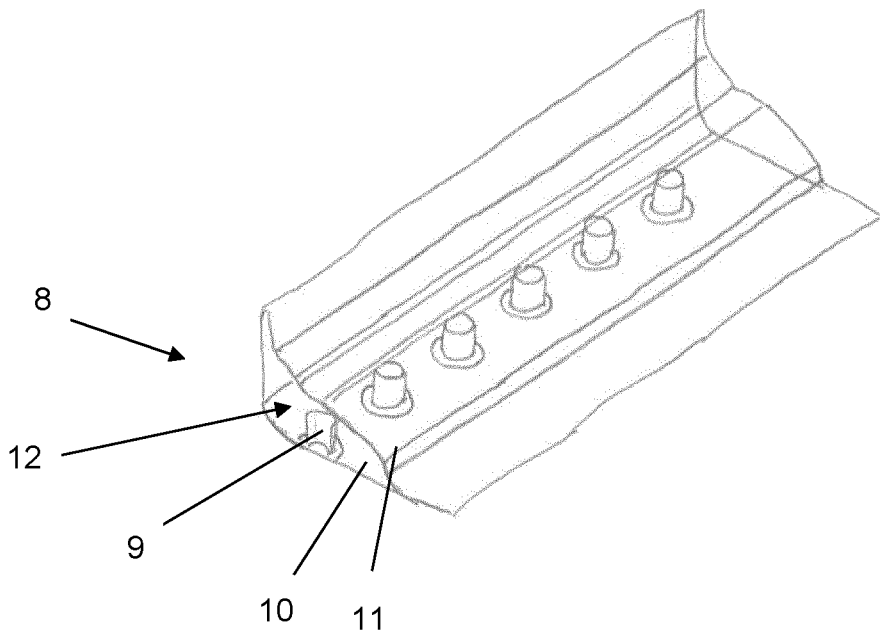
FIG. 3 shows the structure of the vehicle.

FIG. 3 shows the structure of a vehicle, here particularly the region, in which a gearbox 8 of the vehicle is attached to the structure. In the present case, the vehicle structure comprises two plates 10, 11, which define a cavity 12. In this cavity, connection means 9, here tubes, jackets 9, which are here provided equidistantly, are connected to the plate 10. The connection is preferably executed by gluing or welding. According to a preferred embodiment, the tube-like connection means, the jackets, have a flange at their end, which is adjacent to the plate 10, to improve the attachment between the connection means 9 and the plate 10. The flange and the plate 10 each a recess through which a fastening means, for example a screw, a tap and/or a die bolt can be extended into the jacket.

Figure 4:
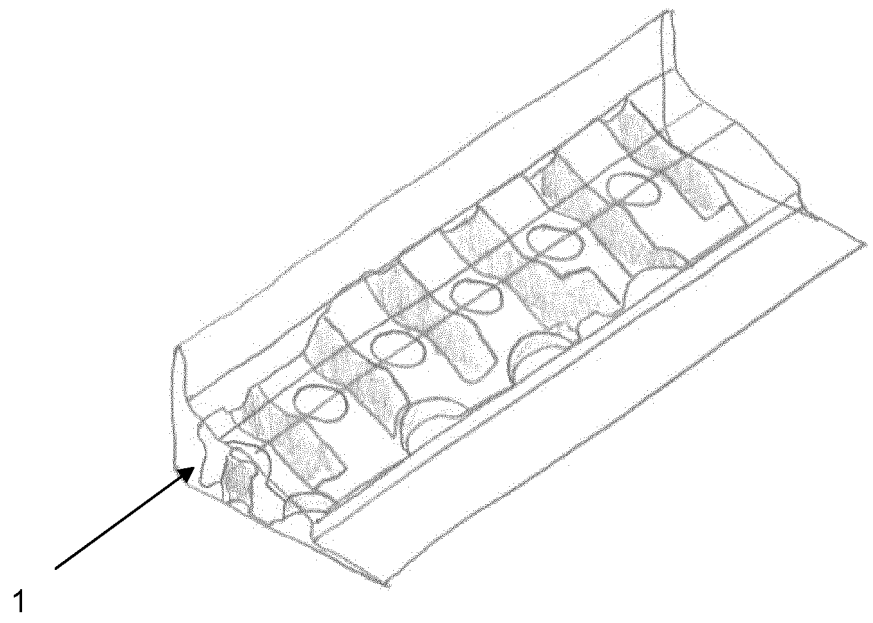
FIG. 4 shows the inventive vehicle.

FIG. 4 shows the inventive vehicle. Regarding the structure of the vehicle and the part 8, preferably the gearbox, reference can be made to the explanations according to FIG. 3. In the embodiment according to FIG. 4, the reinforcement member 1 is now connected to the structure of the vehicle by inserting the connection means, here the jackets 9, into the recesses 4 of the carrier 2 and/or the unexpanded foam layer 3. After attaching the reinforcement member 1 to the structure of the vehicle, the cavity 12 is closed by means of plate 11. The cavity delimits the expansion of the foamable material.

Figure 5:
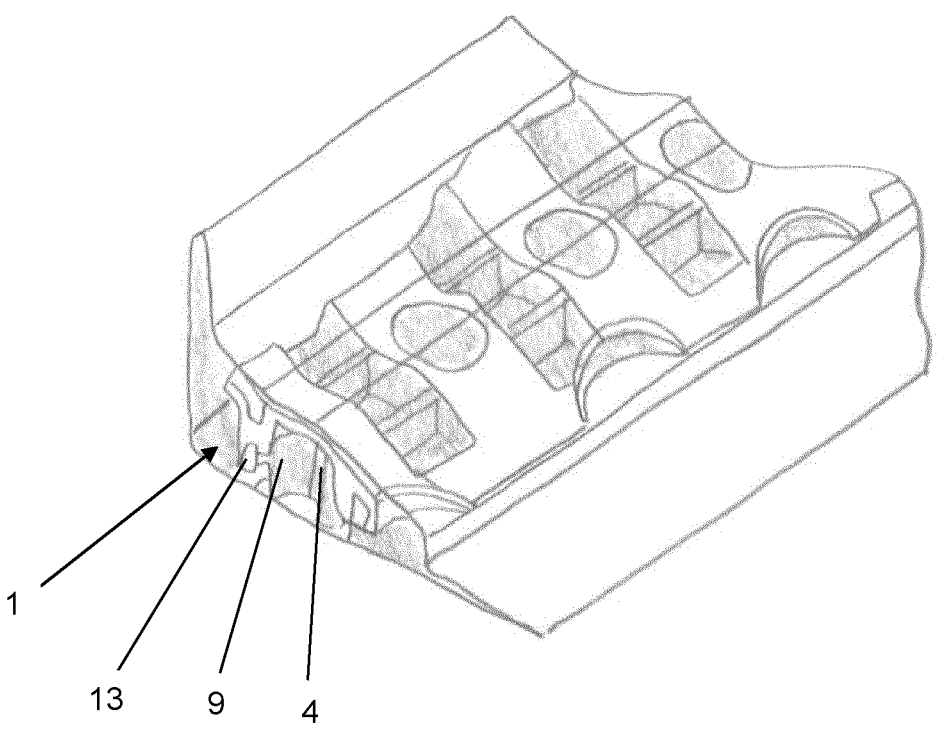
FIGS. 5-8 show details of the reinforcement member 1.

Details of this connection between the connection means 9 and the reinforcement member 1 can also be seen in FIG. 5. The recesses 4 in the carrier 2 take up the here tube-like connection means, the jackets, 9. Preferably, the shape and the size of the inner cross-section of the recess 4 corresponds to the shape and the size of the outer circumference of the connection means 9. Preferably, the size of the inner cross-section of the recess is dimensioned such that at least some connection means 9, there is a form- and/or force-fit between the connection means 9 and the carrier and/or the foamable-layer. Particularly from FIG. 5, it can be seen that prior to expansion, the cross-section of the recess 4 is not reduced by the foamable layer 3.

Figure 6:
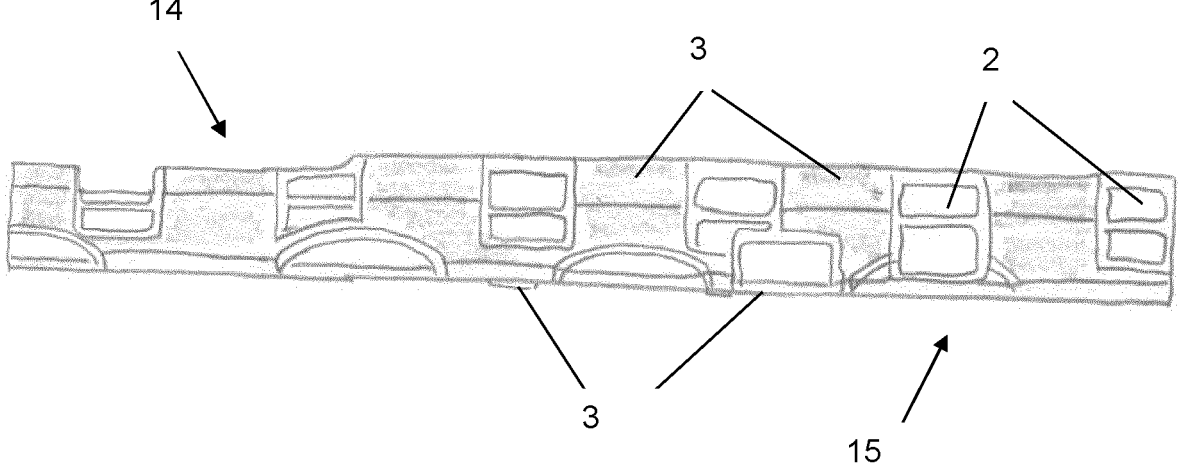

FIG. 6 shows details of the reinforcement member 1. As can be seen from this figure, the foamable-layer is provided on two opposing surfaces 14, 15 of carrier 2. On each surface 14, 15, the foamable-layer is preferably not continuous, but intermittent and the foamable-layer is more preferably provided on the two surfaces 14, 15 in an alternating fashion.

Figure 7:
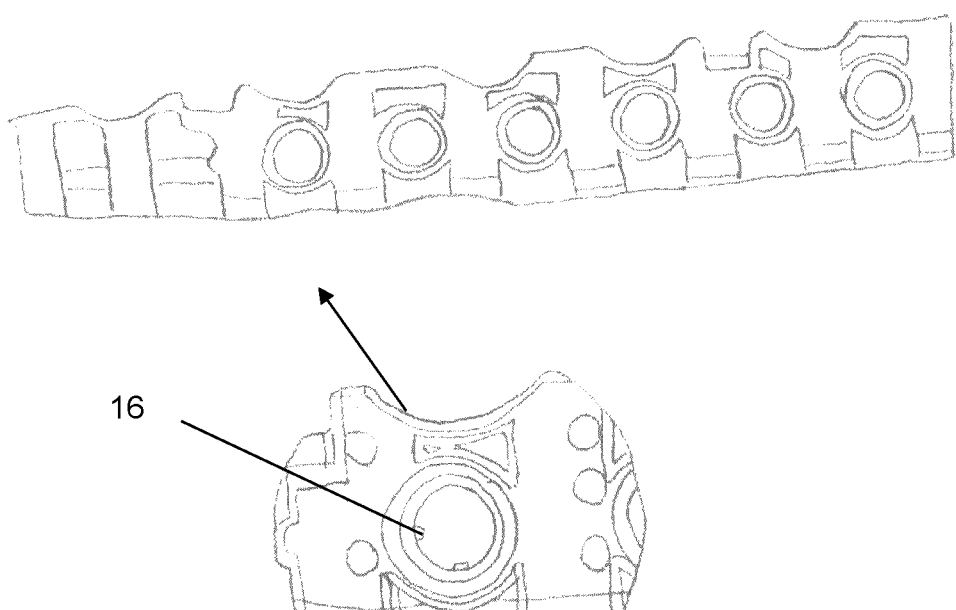

FIG. 7 shows details of a form- and/or force-fit between the connection means 9 and the reinforcement member 1. In the present case, at the inner circumference of here two, preferably non-adjacent, recesses 4 attachments means 16, here protrusions, particularly three protrusions 16, are provided, which, after the connection means 9 have been inserted into the recess, provide a friction-fit between the protrusion 16 and the connection means 9, so that the reinforcement member 1 is fixed to the structure of the vehicle at least prior to the extension of the foamable-layer.

Figure 8:
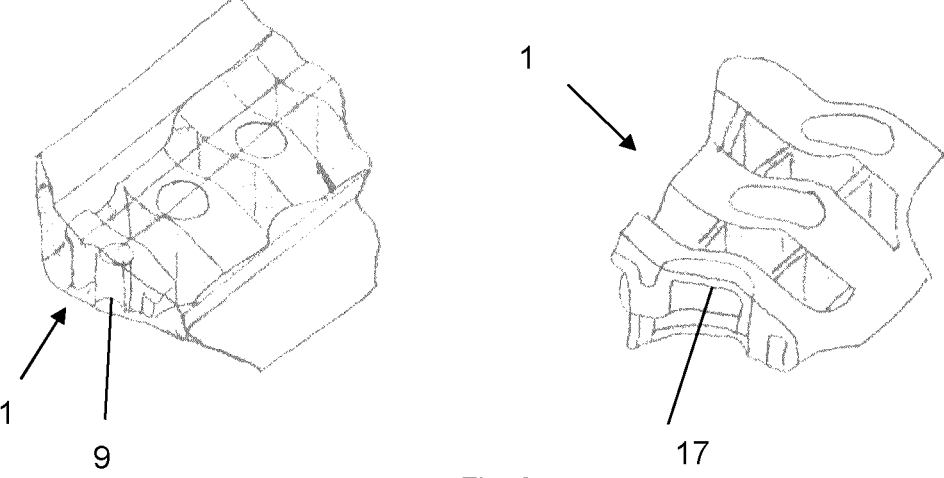

FIG. 8 shows the closure 17 of recess 4 of the carrier 2 on the side which is pointing away from the connection means 9. By means of this, it can be achieved that the cross-section of the connection means 9 remains unblocked prior and after expansion of the foamable-layer 3.

As can be particularly seen from FIGS. 1, 4 and 5, the recess is not only in the carrier 2, but also in the foamable-layer. The recess in the foamable-layer has the reference sign 13. Preferably, the recesses 4 and 13 have the same shape and size. More preferably, the recess 13 is larger than the recess 4. It is preferred, that the cross-section of recess 4 and/or connection means 9 is not blocked by the foamable-layer, so that attachment means e.g. a nut and 7 or fastening means, e.g. a tap or a die bolt can be inserted into the connection means 9.

As can be particularly seen from FIG. 5, the inner cross-section of tube-like connection means 9 is polygonal, so that it may provide anti-rotation means for an attachment means, e.g. a nut, which is inserted into this connection means. The attachment means are preferably also press-fitted into the connection means 9, preferably the jackets.

REFERENCE SIGNS

1 reinforcement member
2 carrier
3 unexpanded foam
4 recess in the carrier
5 transverse rib
6 longitudinal rib
7 longitudinal extension
8 vehicle part, gearbox
9 connection-means, jacket
10 plate, lower plate
11 plate, upper plate
12 cavity
13 recess in the unexpanded foam
14 first surface of the carrier
15 second surface of the carrier
16 attachment means, protrusions
17 closure of recess in the carrier

The invention claimed is:

1. A vehicle with a structure, which comprises:
   a connector;
   a reinforcement member comprising a carrier and having at least one recess on the carrier which takes the connector up and/or which fits onto the connector; and
   a foamable layer comprising a structural foam in contact with the reinforcement member, the foamable layer being located on a first and opposing second surface of the reinforcement member in an alternating sequence;
   wherein the reinforcement member is located at or in the structure where a gearbox is fixed to the structure; and
   wherein the connector receives a fastener; and
   wherein the recess of the carrier can provide a closure on an averted side of the connector to ensure that the cross-section of the connector is unblocked prior to, during, and/or after the expansion of the foamable layer.

2. The vehicle according to claim 1, wherein the reinforcement member and/or the foamable layer comprises at least one recess, wherein the at least one recess takes up the connector.

3. The vehicle according to claim 2, wherein there is a form- and/or force-fit between the connector and the carrier and/or the foamable layer.

4. The vehicle according to claim 3, wherein the connector is a tube, preferably with a flange.

5. The vehicle according to claim 3, wherein the carrier comprises in its recess attachment means, preferably protrusions, which are in contact with an outer circumference of the connector.

6. The vehicle according to claim 4, wherein a cross-section of the tube is unblocked prior to, during, and/or after expansion of the foamable layer.

7. The vehicle according to claim 1, wherein the reinforcement member is provided in a cavity.

8. The vehicle according to claim 4, wherein an inner circumference of the tube is polygonal.

9. The vehicle according to claim 4, wherein a shape of the inner cross section of the tube corresponds to the outer circumferential shape of a nut, which is utilized to attach a gearbox to the structure.

10. The vehicle according to claim 4, wherein the shape and size of an inner circumference of the recess corresponds to the shape and size of an outer circumference of the tube.

11. The vehicle according to claim 1, wherein after the reinforcement member has been attached to a cavity of the vehicle and after the fastener has been inserted into the connector, the foamable layer is expanded under the influence of heat.

12. The vehicle according to claim 4, wherein the fastener is inserted into the tube.

13. The vehicle according to claim 12, wherein the fastener is a bolt.

14. The vehicle according to claim 1, including more than two recesses.

15. The vehicle according to claim 1, wherein the reinforcement member includes a plurality of longitudinal and/or transverse ribs.

* * * * *